United States Patent
Tesanovic

(10) Patent No.: US 12,526,721 B2
(45) Date of Patent: Jan. 13, 2026

(54) METHOD AND APPARATUS FOR MANAGING QUALITY OF SERVICE IN A WIRELESS COMMUNICATION NETWORK

(71) Applicant: Samsung Electronics Co., Ltd., Suwon-si (KR)

(72) Inventor: Milos Tesanovic, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 18/031,521

(22) PCT Filed: Oct. 15, 2021

(86) PCT No.: PCT/KR2021/014372
§ 371 (c)(1),
(2) Date: Apr. 12, 2023

(87) PCT Pub. No.: WO2022/080956
PCT Pub. Date: Apr. 21, 2022

(65) Prior Publication Data
US 2023/0379791 A1 Nov. 23, 2023

(30) Foreign Application Priority Data
Oct. 15, 2020 (GB) ..................... 2016385

(51) Int. Cl.
*H04W 40/12* (2009.01)
*H04L 45/302* (2022.01)
(Continued)

(52) U.S. Cl.
CPC ........... *H04W 40/12* (2013.01); *H04L 45/302* (2013.01); *H04W 24/02* (2013.01);
(Continued)

(58) Field of Classification Search
CPC ...... H04L 45/24; H04L 45/302; H04W 24/02; H04W 28/0231; H04W 28/0268; H04W 40/12; H04W 40/246; H04W 40/248
See application file for complete search history.

(56) References Cited

U.S. PATENT DOCUMENTS 6,985,476 B1 * 1/2006 Elliott ..................... H04L 45/20
370/349
7,822,023 B2 * 10/2010 Lahetkangas ........... H04L 45/30
370/389
(Continued)

FOREIGN PATENT DOCUMENTS

EP 4 211 822 A1 7/2023
WO 2019/209316 A1 10/2019
(Continued)

OTHER PUBLICATIONS

United Kingdom Search Report dated Jan. 10, 2024, issued in United Kingdom Application No. GB2309697.7.
(Continued)

*Primary Examiner* — Dung B Huynh
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). Methods, apparatus and/or systems for managing QoS are disclosed. According to an example, a method for managing QoS comprises obtaining first information on one or more conditions at a plurality of second nodes, identifying a plurality of routes from a location to a destination in a multi-hop network, and selecting a first route for a first bearer from among the plurality of routes, based on the first information, second information on a network
(Continued)

topology and a first quality of service (QoS) corresponding to the first bearer.

14 Claims, 7 Drawing Sheets

(51) Int. Cl.
*H04W 24/02* (2009.01)
*H04W 28/02* (2009.01)
*H04W 40/24* (2009.01)

(52) U.S. Cl.
CPC ... *H04W 28/0231* (2013.01); *H04W 28/0268* (2013.01); *H04W 40/246* (2013.01)

(56) References Cited

U.S. PATENT DOCUMENTS

| | | | | |
|---|---|---|---|---|
| 8,160,586 | B2* | 4/2012 | Herz | H04B 1/406 455/445 |
| 9,264,373 | B2 | 2/2016 | Wan | H04L 47/36 |
| 9,705,747 | B1* | 7/2017 | Xue | H04L 45/125 |
| 9,813,939 | B1* | 11/2017 | Marupaduga | H04W 28/0205 |
| 10,244,422 | B2 | 3/2019 | Parulkar | H04W 28/0247 |
| 10,616,709 | B2* | 4/2020 | Krzych | G01S 5/0294 |
| 11,197,224 | B1* | 12/2021 | Baker | H04W 28/021 |
| 11,503,495 | B2* | 11/2022 | Adjakple | H04W 28/0263 |
| 11,765,615 | B2* | 9/2023 | Jactat | H04W 28/0263 370/229 |
| 12,284,589 | B2* | 4/2025 | Hoang | H04W 88/04 |
| 2005/0053004 | A1* | 3/2005 | Cain | H04L 45/302 370/252 |
| 2006/0029035 | A1* | 2/2006 | Chase | H04L 45/02 370/351 |
| 2006/0109787 | A1* | 5/2006 | Strutt | H04W 40/22 370/235 |
| 2009/0154407 | A1* | 6/2009 | Jeong | H04W 48/08 370/329 |
| 2010/0278102 | A1* | 11/2010 | Lee | H04L 45/38 370/328 |
| 2011/0149844 | A1* | 6/2011 | G | H04L 45/122 370/328 |
| 2011/0231862 | A1* | 9/2011 | Walsh | G06F 13/00 719/318 |
| 2012/0163171 | A1* | 6/2012 | Lee | H04W 40/12 370/231 |
| 2014/0269691 | A1* | 9/2014 | Xue | H04L 45/38 370/392 |
| 2014/0313903 | A1* | 10/2014 | Kikuzuki | H04W 8/04 370/238 |
| 2016/0142321 | A1* | 5/2016 | Gage | H04W 76/10 370/235 |
| 2016/0142954 | A1* | 5/2016 | Cho | H04W 36/0066 370/331 |
| 2018/0146467 | A1* | 5/2018 | Kim | H04W 28/065 |
| 2018/0234524 | A1* | 8/2018 | Cheng | H04W 28/02 |
| 2018/0234903 | A1* | 8/2018 | Jheng | H04W 36/0066 |
| 2018/0302832 | A1* | 10/2018 | Huang | H04W 36/26 |
| 2018/0331935 | A1* | 11/2018 | Ross | H04L 43/16 |
| 2018/0337846 | A1* | 11/2018 | Lee | H04L 5/0053 |
| 2019/0132784 | A1* | 5/2019 | Thubert | H04W 72/044 |
| 2019/0260658 | A1* | 8/2019 | Gell | H04L 67/1097 |
| 2019/0327636 | A1 | 10/2019 | Dao | |
| 2020/0029384 | A1* | 1/2020 | Hong | H04W 36/305 |
| 2020/0137614 | A1* | 4/2020 | Hampel | H04W 76/11 |
| 2020/0145876 | A1 | 5/2020 | Dao et al. | |
| 2020/0187040 | A1* | 6/2020 | Tsai | H04W 24/10 |
| 2020/0196219 | A1* | 6/2020 | Hashemi | H04W 40/28 |
| 2020/0221344 | A1* | 7/2020 | Jeon | H04W 28/0278 |
| 2020/0267602 | A1* | 8/2020 | Hashemi | H04W 16/10 |
| 2020/0328858 | A1* | 10/2020 | Medard | H04L 5/0046 |
| 2020/0329416 | A1* | 10/2020 | Taneja | H04W 40/02 |
| 2020/0351700 | A1* | 11/2020 | Han | H04W 80/02 |
| 2020/0383030 | A1* | 12/2020 | Cho | H04W 84/18 |
| 2021/0014768 | A1* | 1/2021 | Hong | H04W 40/22 |
| 2021/0045037 | A1* | 2/2021 | Wei | H04W 40/22 |
| 2021/0058819 | A1* | 2/2021 | Ozturk | H04W 72/56 |
| 2021/0092667 | A1* | 3/2021 | Zhu | H04W 40/24 |
| 2021/0105698 | A1* | 4/2021 | Jactat | H04L 45/302 |
| 2021/0120454 | A1* | 4/2021 | Chennichetty | H04B 7/0452 |
| 2021/0144781 | A1* | 5/2021 | Xu | H04W 76/10 |
| 2021/0168645 | A1* | 6/2021 | Adjakple | H04W 72/54 |
| 2021/0250217 | A1* | 8/2021 | Shattil | H04B 7/0632 |
| 2021/0250842 | A1* | 8/2021 | Pang | H04L 27/265 |
| 2021/0266815 | A1* | 8/2021 | Wei | H04W 40/12 |
| 2021/0303570 | A1* | 9/2021 | Kondiles | G06F 16/24542 |
| 2021/0351997 | A1* | 11/2021 | Luft | H04L 43/16 |
| 2021/0368580 | A1* | 11/2021 | Wu | H04W 72/04 |
| 2021/0392565 | A1* | 12/2021 | Akl | H04L 45/24 |
| 2022/0014976 | A1* | 1/2022 | Luo | H04W 36/0044 |
| 2022/0030459 | A1* | 1/2022 | Seong | H04W 24/08 |
| 2022/0053362 | A1* | 2/2022 | Sebire | H04W 28/0252 |
| 2022/0070718 | A1* | 3/2022 | Luo | H04W 76/12 |
| 2022/0078663 | A1* | 3/2022 | Luo | H04L 47/283 |
| 2022/0078808 | A1* | 3/2022 | Luo | H04W 28/0268 |
| 2022/0095397 | A1* | 3/2022 | Mildh | H04W 76/12 |
| 2022/0095415 | A1* | 3/2022 | Liu | H04W 80/02 |
| 2022/0141752 | A1* | 5/2022 | Miao | H04L 45/54 370/328 |
| 2022/0174538 | A1* | 6/2022 | Zhu | H04W 28/0263 |
| 2022/0174579 | A1* | 6/2022 | Zhuo | H04L 45/74 |
| 2022/0182917 | A1* | 6/2022 | Muhammad | H04W 40/248 |
| 2022/0240155 | A1* | 7/2022 | Yang | H04W 40/12 |
| 2022/0272070 | A1* | 8/2022 | Heo | G06F 9/5016 |
| 2022/0330265 | A1* | 10/2022 | Luo | H04W 72/20 |
| 2022/0393966 | A1* | 12/2022 | Eriksson | H04L 45/24 |
| 2022/0394797 | A1* | 12/2022 | Pradas | H04W 76/30 |
| 2022/0408372 | A1* | 12/2022 | Feuersaenger | H04W 74/0833 |
| 2023/0075709 | A1* | 3/2023 | Shariat | H04W 28/0967 |
| 2023/0083708 | A1* | 3/2023 | Muhammad | H04W 40/246 370/329 |
| 2023/0156848 | A1* | 5/2023 | Zhu | H04W 74/0841 370/329 |
| 2023/0189045 | A1* | 6/2023 | Chen | H04W 28/0252 370/252 |
| 2023/0189050 | A1* | 6/2023 | Rao | H04W 28/0263 370/231 |
| 2023/0217426 | A1* | 7/2023 | Yi | H04W 40/22 370/329 |
| 2023/0292204 | A1* | 9/2023 | Mildh | H04W 36/18 |
| 2023/0300713 | A1* | 9/2023 | Hoang | H04W 40/24 370/254 |
| 2023/0397085 | A1* | 12/2023 | Wang | H04W 24/04 |
| 2024/0259906 | A1* | 8/2024 | Freda | H04W 36/302 |
| 2025/0203696 | A1* | 6/2025 | Fujishiro | H04W 36/305 |

FOREIGN PATENT DOCUMENTS

| | | |
|---|---|---|
| WO | 2019/242610 A1 | 12/2019 |
| WO | 2020/088253 A1 | 5/2020 |
| WO | 2020/167186 A1 | 8/2020 |
| WO | 2022/056006 A1 | 3/2022 |

OTHER PUBLICATIONS

European Search Report dated Feb. 2, 2024, issued in European Application No. 21880602.4.
CATT; Consideration on Multi-Hop Performance: QoS, Latency, Fairness; 3GPP TSG-RAN WG3 Meeting #109-e; R3-204735; Aug. 7, 2020.
ZTE, Sanechips; Consideration on multi-hop latency for IAB network; 3GPP TSG-RAN WG3 #109-e; R3-205168; Aug. 7, 2020.
ZTE, Sanechips; Discussion on fairness in IAB scheduling; 3GPP TSG-RAN WG3 Meeting #109 e; R3-205170; Aug. 7, 2020.
Great Britain Office Action dated Feb. 1, 2023, issued in a Great Britain Application No. 2016385.3.
Great Britain Office Action dated Jan. 1, 2023, issued in a Great Britain Application No. 2016385.3.

(56) References Cited

OTHER PUBLICATIONS

European Search Report dated Nov. 19, 2025, issued in European Patent Application No. 21880602.4.

* cited by examiner

[Figure 1]
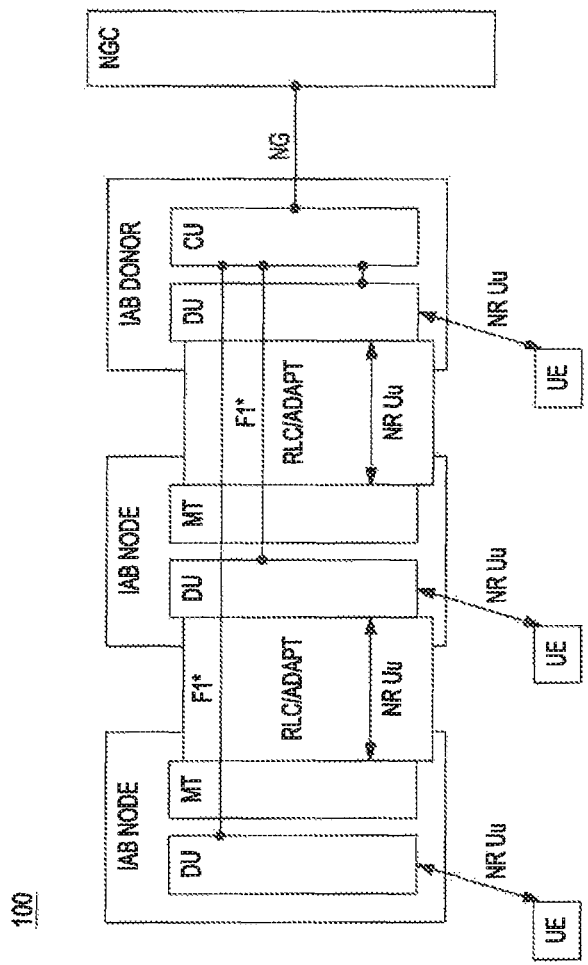

[Figure 2]
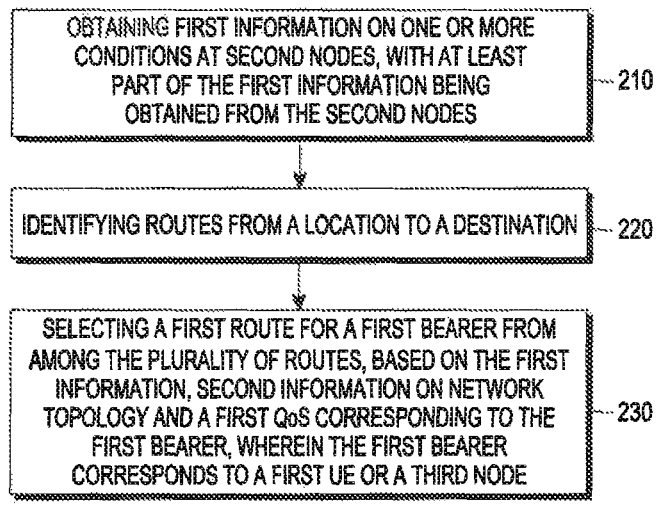
[Figure 3]
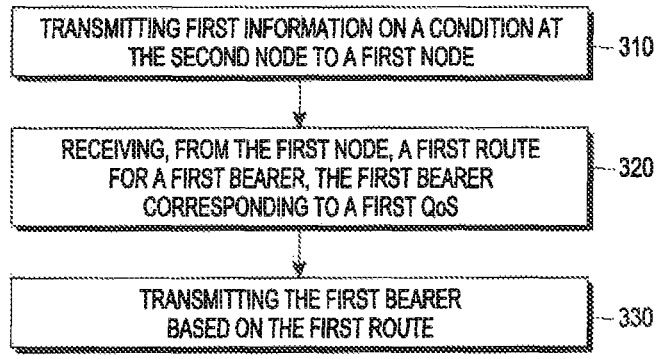

[Figure 4]
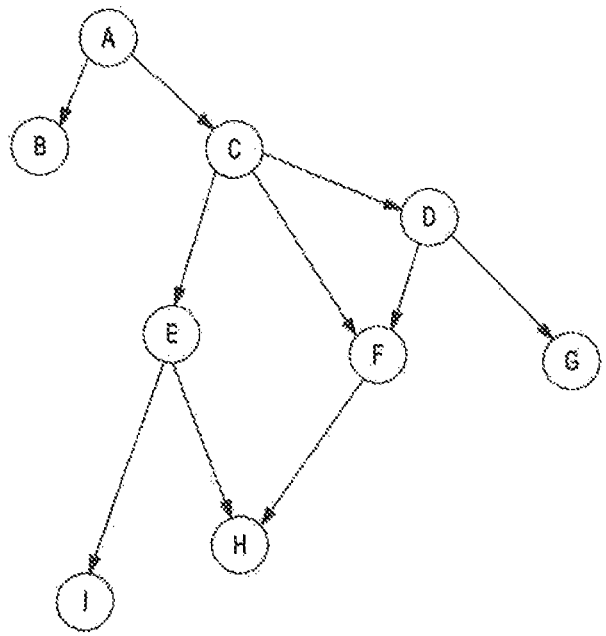
[Figure 5]
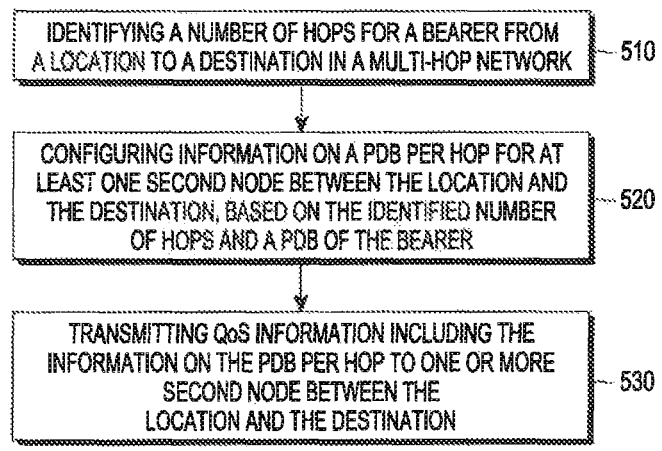

[Figure 6]
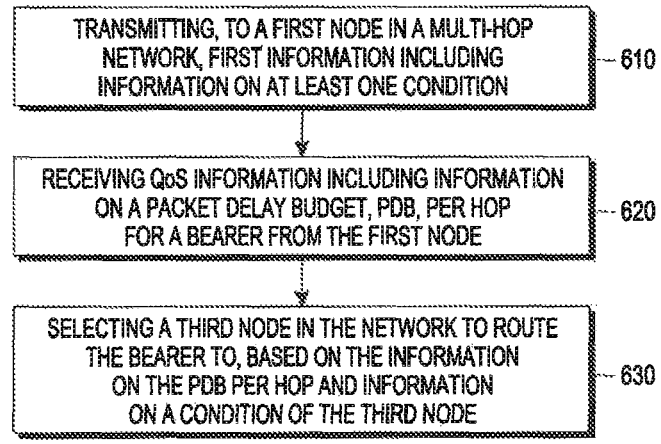
[Figure 7]
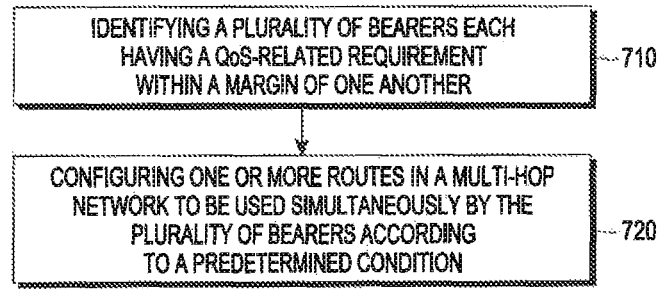
[Figure 8]
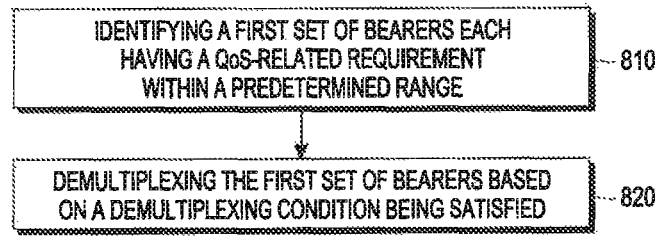

[Figure 9]
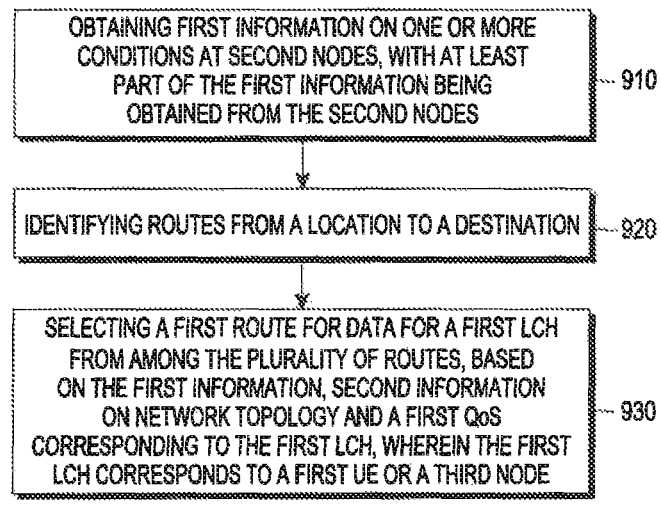
[Figure 10]
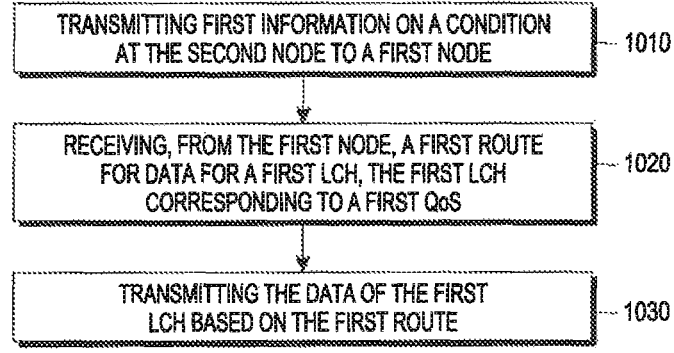

[Figure 11]
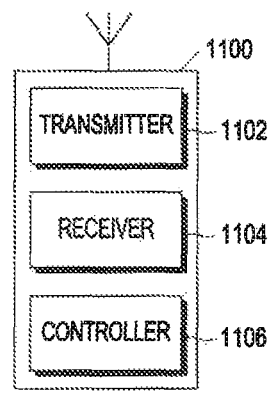

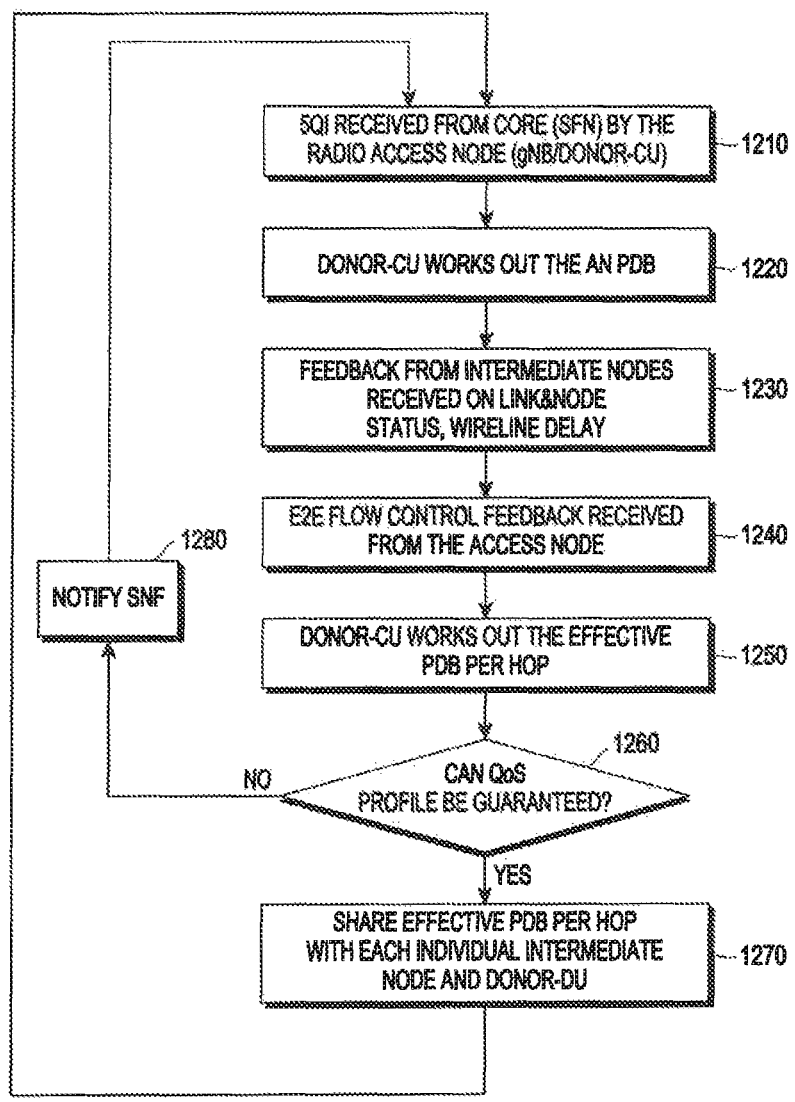
[Figure 12]

METHOD AND APPARATUS FOR MANAGING QUALITY OF SERVICE IN A WIRELESS COMMUNICATION NETWORK

CROSS-REFERENCE TO RELATED APPLICATION(S)

This application is a U.S. National Stage application under 35 U.S.C. § 371 of an International application number PCT/KR2021/014372, filed on Oct. 15, 2021, which is based on and claimed priority of a Great Britain patent application number 2016385.3, filed on Oct. 15, 2020, in the Great Britain Intellectual Property Office, the disclosure of which is incorporated by reference herein in its entirety.

TECHNICAL FIELD

Certain examples of the present disclosure relate to methods, apparatus and/or system for managing QoS in a multi-hop network. In particular, certain examples of the present disclosure provide methods, apparatus and/or systems for managing QoS in a multi-hop Integrated Access and Backhaul (IAB) network for $3^{rd}$ Generation Partnership Project (3GPP) $5^{th}$ Generation (5G) New Radio (NR), and/or in other NR-based relay networks.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In 3rd Generation Partnership Project (3GPP) 5th Generation (5G) New Radio (NR), Integrated Access and Backhaul (IAB) is a technique for providing wireless backhaul as an alternative to a fibre backhaul network. An IAB network comprises IAB nodes, at which wireless resources are shared between wireless backhaul and access links. Due to the use of the mmWave spectrum, and consequentially the limited coverage area of an IAB node, the backhaul network is typically implemented as a multi-hop network with backhaul traffic traversing multiple IAB nodes. The IAB nodes have a child-parent node relationship.

Improvements to topology-wide fairness is one of the objectives of NR Rel-17 IAB work. While working on NR Rel-16, the assumption was that fairness would be enabled by implementation and ensured by operators. In NR Rel-17, there is a desire to provide normative mechanisms to ensure and improve fairness across the topology.

Accordingly, what is desired are solutions to address the issue of fairness and/or QoS management for an IAB network.

DISCLOSURE OF INVENTION

Technical Problem

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present invention is defined in the independent claims. Advantageous features are defined in the dependent claims.

Embodiments or examples disclosed in the description and/or figures falling outside the scope of the claims are to be understood as examples useful for understanding the present invention.

Other aspects, advantages, and salient features of the invention will become apparent to those skilled in the art from the following detailed description taken in conjunction with the accompanying drawings.

In accordance with an aspect of the present disclosure, a method of managing Quality of Service (QoS) the method comprising: obtaining, by a first node in a multi-hop network, first information on one or more conditions at a plurality of second nodes, wherein at least part of the first information is obtained from the plurality of second nodes; identifying, by the first node, a plurality of routes from a location to a destination in the multi-hop network; and selecting, by the first node, a first route for a first bearer from among the plurality of routes, based on the first information, second information on network topology and a first QoS corresponding to the first bearer, wherein the first bearer corresponds to a first UE or a third node in the multi-hop network; or a first route for data for a first logical channel, LCH, from among the plurality of routes, based on the first information, second information on network topology and a first QoS corresponding to the first LCH, wherein the first LCH corresponds to a first UE or a third node in the multi-hop network.

Further, wherein the first information includes one or more of: information on a number of hops to a destination in the multi-hop network for the first bearer or the first LCH; information on a number of bearers being carried on one or more backhaul (BH) radio link control (RLC) channels on one or more links of one or more different routes to the destination; information on congestion conditions on one or more different routes in the multi-hop network; information on radio conditions on one or more different routes to the destination in the multi-hop network, the radio conditions including reports of radio link failure (RLF) or availability of a link; information on buffer status at one or more second nodes in the multi-hop network; information on wireless delay at one or more second nodes, the wireline delay including at least one of information on a processing delay and radio protocol operation delay; information on Tx/Rx operation switching delay at second nodes; and information on end-to-end (E2E) flow control feedback.

Further, wherein each route of the plurality of routes includes one or more of the plurality of second nodes.

Further, wherein selecting the first route comprises: determining a delay for each route of the plurality of routes, based on the first information; and selecting the first route based on the determined delay, the second information and the first QoS.

Further, wherein selecting the first route comprises: if the location is a first number of hops from the destination, selecting one route among the plurality of routes, based on the second information, the first QoS and the selected one route corresponding to a first average delay per hop; and if the location is a second number of hops from the destination greater than the first number of hops, selecting another route among the plurality of routes, based on the second information, the first QoS and the selected other route corresponding to a second average delay per hop shorter than the first delay.

The method further comprising: if the first route is for the first bearer, selecting, by the first node, a second route for a second bearer from among the plurality of routes, based on the first information, the second information and a second QoS corresponding to the second bearer, wherein the second bearer corresponds to a second UE or a fourth node in the multi-hop network; or if the first route is for data for the first logical channel (LCH), selecting, by the first node, a second route for data for a second LCH from among the plurality of routes, based on the first information, the second information and a second QoS corresponding to the second LCH, wherein the second LCH corresponds to a second UE or a fourth node in the multi-hop network.

Further, wherein treatment of the first bearer and the second bearer according to the first information, or treatment of the first LCH and the second LCH according to the first information, is normalized such that at least one of: the first QoS is achieved regardless of a place in the multi-hop network where the first UE attaches or where the third node is located; and the second QoS is achieved regardless of a place in the multi-hop network where the second UE attaches or where the fourth node is located.

Further, wherein treatment of one of the first bearer and the second bearer is weighted in favour of the one of the first bearer and the second bearer over the other one of the first bearer and the second bearer; or wherein treatment of one of the first LCH and the second LCH is weighted in favour of the one of the first LCH and the second LCH over the other one of the first LCH and the second LCH.

Further, wherein the first QoS and the second QoS are within a predetermined margin of one another, or the first QoS and the second QoS are the same.

Further, wherein the predetermined margin is determined, by the first node, according to one or more of: information on usage of the first UE; information on usage of the second UE; historic Quality of Experience (QoE) information for one or more of the first bearer and the second bearer; information on a Service Level Agreement, SLA, for the first UE; and information on a SLA for the second UE.

Further, wherein the first QoS is determined, by the first node, as the average QoS across all bearers of the first UE or a subset of all bearers of the first UE; or wherein the first QoS is determined, by the first node, as the average QoS across all LCHs of the first UE or a subset of all LCHs of the first UE.

Further, wherein the subset of bearers includes: bearers with predetermined critical services; bearers with a Packet Delay Budget, PDB, below a predetermined level; or all non best-effort (BE) bearers.

Further, where the selecting of the first route is further configured, by the first node, based on one or more of: load balancing in the multi-hop network,
    equitable use of available paths in the multi-hop network, information on fair use of processing resources of nodes in the multi-hop network, avoidance of use of second nodes having a buffer occupancy greater than a predetermined threshold, and the number of bearers being carried on a single BH RLC channel.

Further, wherein at least another part of the first information is obtained by estimating, by the first node, one or more conditions in the multi-hop network based on stored data regarding the multi-hop network.

Further, wherein the first route is selected based on the first information to satisfy the first QoS.

Further, wherein the second information on network topology comprises one or more of: information on the destination, information on where the first UE attaches or where the third node is located in the multi-hop network, and information on network conditions.

The method Further comprising configuring, by the first node, the first route for the first bearer for simultaneous use by a group of bearers including at least one third bearer and the first bearer, according to a predetermined condition; wherein each of the at least one third bearer correspond to a QoS within a predetermined range of the first QoS.

Further, wherein configuring the first route according to the predetermined condition includes configuring sharing of the first route based on: load balancing in at least part of the multi-hop network; and a number of backhaul (BH) radio link control (RLC) channels on a single link configured to support the QoS-related requirement.

Further, wherein, in a case where the number of BH RLC channels on a single link is insufficient, the method comprises aggregating, by the first node, two or more bearers from among the group of bearers.

The method further comprising: configuring, by the first node, information for demultiplexing at least a portion of the group of bearers; and transmitting, by the first node to a fifth node in the multi-hop network, the information for demultiplexing the one or more bearers of the group of bearers.

Further, wherein the fifth node is located along the first route in the multi-hop network.

Further, wherein the group of bearers are multiplexed to a first RLC channel; and wherein the information for demultiplexing indicates a second RLC channel to which one or more of the portion of the plurality of bearers is to be multiplexed to.

Further, wherein the Backhaul Adaptation Protocol (BAP) includes a bearer ID for each of the group of bearers; and wherein configuring the first route further comprises configuring the first route based on the bearer IDs.

Further, wherein a BAP header comprises QoS information for each of the group of bearers, the QoS information including at least one of a guaranteed bit rate (GBR), minimal packet error rate (PER). and packet delay budget (PDB).

In accordance with another aspect of the present disclosure, A first node for managing QoS in a multi-hop network, wherein the first node is configured to: obtain first information on one or more conditions at a plurality of second nodes in the multi-hop network, wherein at least part of the first information is obtained from the plurality of second nodes; identify a plurality of routes from a location to a destination in the multi-hop network; and select: a first route for a first bearer from among the plurality of routes, based on the first information, second information on network topology and a first QoS corresponding to the first bearer, wherein the first bearer corresponds to a first UE or a third node in the multi-hop network; or a first route for data for a first logical channel (LCH) from among the plurality of routes, based on the first information, second information on network topology and a first QoS corresponding to the first LCH, wherein the first LCH corresponds to a first UE or a third node in the multi-hop network.

In accordance with another aspect of the present disclosure, a method of managing QoS, the method comprising: transmitting, by a second node in a multi-hop network, first information on a condition at the second node to a first node in the multi-hop network; receiving, by the second node from the first node: a first route for a first bearer in the multi-hop network, the first bearer corresponding to a first QoS, or a first route for data for a first logical channel (LCH) in the multi-hop network, the first LCH corresponding to a first QoS; and transmitting, by the second node, the first bearer or the data for the first LCH based on the first route.

Further, wherein the first information includes one or more of: information on congestion conditions on one or more different routes; information on a number of bearers being carried on one or more BH RLC channels on one or more links of one or more different routes to the destination; information on radio conditions on one or more different routes to the destination in the multi-hop network, the radio conditions including reports of radio link failure (RLF) or availability of a link; information on buffer status at the second node in the multi-hop network; information on wireless delay at the second node, the wireline delay including at least one of information on a processing delay and radio protocol operation delay; information on Tx/Rx operation switching delay at the second node; and information on end-to-end (E2E) flow control feedback.

Further, wherein the first route for the first bearer is for simultaneous use by a group of bearers including at least one second bearer and the first bearer, according to a predetermined condition; and wherein each of the at least one second bearer correspond to a QoS within a predetermined range of the first QoS.

The method further comprising: transmitting, by the second node, the group of bearers to a third node in the multi-hop network based on the first route, wherein the third node is a parent node of the second node or a child node of the second node; or demultiplexing, by the second node, one or more bearers of the group of bearers.

Further, wherein the one or more bearers are demultiplexed if the second node detects that a condition is satisfied or if the second node receives, from the first node, information indicating that the condition has been detected to be satisfied; and wherein the condition corresponds to one or more of: a determination that QoS of each of the group of bearers cannot be guaranteed if the group of bearers remain multiplexed upon being transmitted from the first node; a determination that one or more links in the multi-hop network are unavailable and/or one or more links in the multi-hop network have throughput below a threshold; and a determination that the group of bearers includes bearers having different destinations in the multi-hop network.

In accordance with another aspect of the present disclosure, a second node for managing QoS in a multi-hop network, wherein the second node is configured to: transmit first information on a condition at the second node to a first node in the multi-hop network; receive, from the first node: a first route for a first bearer in the multi-hop network, the first bearer corresponding to a first QoS, or a first route for data for a first logical channel (LCH) in the multi-hop network, the first LCH corresponding to a first QoS; and transmit, by the second node, the first bearer or the data of the first LCH based on the first route.

In accordance with another aspect of the present disclosure, a method of managing Quality of Service (QoS) the method comprising: identifying, by a first node, a number of hops for a bearer from a location in a multi-hop network to a destination in the multi-hop network; configuring, by the first node, information on a Packet Delay Budget, PDB, per hop for at least one second node between the location and the destination, based on the identified number of hops and a PDB of the bearer; and transmitting, by the first node, QoS information including the information on the PDB per hop to one or more second node between the location and the destination. The method further comprising: obtaining, by the first node, first information including information on at least one condition in the multi-hop network, wherein the information is at least partly obtained from one or more second nodes in the multi-hop network; and determining an effective PDB per hop for at least one second node between the location and the destination, based on the PDB of the bearer and the first information; wherein the information on the PDB per hop includes the effective PDB per hop.

Further, wherein the first information includes one or more of: information on a number of hops to a destination in the multi-hop network for the bearer; information on congestion conditions on one or more different routes to the destination in the multi-hop network; information on radio conditions on one or more different routes to the destination in the multi-hop network, the radio conditions including reports of RLF; information on buffer status at one or more second nodes in the multi-hop network; information on wireless delay at one or more second nodes, the wireline delay including at least one of information on a processing delay and radio protocol operation delay; information on Tx/Rx operation switching delay at second nodes; and information on end-to-end (E2E) flow control feedback.

Further, wherein determining the effective PDB per hop comprises: determining a PDB per hop based on the identified number of hops and the PDB of the bearer; and increasing or decreasing the determined PDB per hop, based on the first information.

Further, wherein the location corresponds to an attachment location of a UE in the multi-hop network, the UE corresponding to the bearer; or wherein the location corresponds to a location of a third node in the multi-hop network, the third node corresponding to the bearer.

In accordance with another aspect of the present disclosure, a first node for managing QoS in a multi-hop network, wherein the first node is configured to:
    identify a number of hops for a bearer from a location in a multi-hop network to a destination in the multi-hop network; configure information on a Packet Delay Budget, PDB, per hop for at least one second node between the location and the destination, based on the identified number of hops and a PDB of the bearer; and transmit QoS information including the information on the PDB per hop to one or more second node between the location and the destination.

In accordance with another aspect of the present disclosure, A method of managing Quality of Service (QoS), the method comprising: transmitting, by a second node in a multi-hop network to a first node in the multi-hop network, first information including information on at least one condition in the multi-hop network; receiving, by the second node, QoS information including information on a Packet Delay Budget, PDB, per hop for a bearer from the first node; and selecting, by the second node, a third node in the multi-hop network to route the bearer to, based on the information on the PDB per hop and information on a condition of the third node.

Further, wherein the information on the PDB per hop includes an effective PDB per hop.

Further, wherein, on the downlink, the third node is a child node of the second node, and, on the uplink, the third node is a parent node of the second node.

Further, wherein the information on the PDB per hop indicates for the second node to select the third node; or wherein the third node is selected, by the second node, based on determining a delay corresponding to the third node equal to or less than the PDB per hop.

In accordance with another aspect of the present disclosure, a second node for managing QoS in a multi-hop network, wherein the second node is configured to: transmit, to a first node in the multi-hop network, first information including information on at least one condition in the multi-hop network; receive QoS information including information related to a Packet Delay Budget, PDB, per hop for a bearer from the first node; and select a third node in the multi-hop network to route the bearer to, based on the information related to the PDB per hop and information on a condition of the third node.

DESCRIPTION OF DRAWINGS

Embodiments of the invention are further described hereinafter with reference to the accompanying drawings, in which:

FIG. 1 illustrates one example architecture for multi-hop backhauling;

FIG. 2 is a flow diagram of a method according to an example of the present disclosure;

FIG. 3 is a flow diagram of another method according to an example of the present disclosure;

FIG. 4 illustrates a multi-hop network and relationships between nodes in a multi-hop network;

FIG. 5 is a flow diagram of another method according to an example of the present disclosure;

FIG. 6 is a flow diagram of another method according to an example of the present disclosure;

FIG. 7 is a flow diagram of another method according to an example of the present disclosure;

FIG. 8 is a flow diagram of another method according to an example of the present disclosure;

FIG. 9 is a flow diagram of another method according to an example of the present disclosure;

FIG. 10 is a flow diagram of another method according to an example of the present disclosure;

FIG. 11 is a block diagram illustrating an example structure of a network entity in accordance with certain examples of the present disclosure;

FIG. 12 is a flow diagram of a method according to an example of the present disclosure.

MODE FOR INVENTION

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but, are merely used to enable a clear and consistent understanding of the examples disclosed herein.

Throughout the description and claims, the words "comprise", "contain" and "include", and variations thereof, for example "comprising", "containing" and "including", means "including but not limited to", and is not intended to (and does not) exclude other features, elements, components, integers, steps, processes, functions, characteristics, and the like.

Throughout the description and claims, the singular form, for example "a", "an" and "the", encompasses the plural unless the context otherwise requires. For example, reference to "an object" includes reference to one or more of such objects.

Throughout the description and claims, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim are to be understood to be applicable to any other aspect, embodiment, example or claim disclosed herein unless incompatible therewith.

Certain examples of the present disclosure provide methods, apparatus and/or systems for resource scheduling in a multi-hop network. The following examples are applicable to, and use terminology associated with, 3GPP 5G. For example, certain examples of the present disclosure provide methods, apparatus and/or systems for UL resource scheduling in a hop-by-hop IAB network within 3GPP 5G NR, and other NR-based relay networks. However, the skilled person will appreciate that the techniques disclosed herein are not limited to these examples or to 3GPP 5G, and may be applied in any suitable system or standard, for example one or more existing and/or future generation wireless communication systems or standards. The skilled person will appreciate that the techniques disclosed herein may be applied in any existing or future releases of 3GPP 5G NR or any other relevant standard.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network. For example, the functionality of an IAB node in the examples below may be applied to any other suitable type of entity performing functions of a network node.

The skilled person will appreciate that certain examples of the present disclosure may not be directly related to standardization but rather proprietary implementation of some of the Integrated Access and Backhaul (IAB) functions.

The skilled person will appreciate that the present invention is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements, entities and/or messages may be added to the examples disclosed herein.

One or more non-essential elements, entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

Certain examples of the present disclosure may be provided in the form of an apparatus/device/network entity configured to perform one or more defined network functions and/or a method therefor. Such an apparatus/device/network entity may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). Certain examples of the present disclosure may be provided in the form of a system (e.g. a network) comprising one or more such apparatuses/devices/network entities, and/or a method therefor. For example, in the following examples, a network may include one or more IAB nodes.

It will be appreciated that examples of the present disclosure may be realized in the form of hardware, software or a combination of hardware and software. Certain examples of the present disclosure may provide a computer program comprising instructions or code which, when executed, implement a method, system and/or apparatus in accordance with any aspect, claim, example and/or embodiment disclosed herein. Certain embodiments of the present disclosure provide a machine-readable storage storing such a program.

To satisfy extremely high data rate requirements, the 3GPP 5G NR standard utilises communication frequencies in a relatively high range, from 30 GHz to 300 GHz, corresponding to wavelengths in the millimetre (mm) range (mmWave communication). Such mmWave communication provides a large available bandwidth and high transmission speeds. However, problems with mmWave communication include severe signal path loss and low penetration, resulting in a relatively short transmission range. This in turn requires a greater density of base stations deployment.

Due to the relatively high cost and other difficulties associated with deployment of fibre transport network links, wireless backhauling can be used as an alternative. Integrated Access and Backhaul (IAB), in which a part of the radio resources is used for backhauling, is currently being standardized for 3GPP Rel-16.

According to 3GPP TR 38.874 (e.g. V16.0.0, 2018-12), the backhaul architecture is expected to support multi-hop backhauling in which backhaul traffic is wirelessly relayed by network nodes via one or more hops using mmWave communication. Multi-hop backhauling provides more range extension than single hop. This is especially beneficial for above-6 GHz frequencies due to their limited range. Multi-hop backhauling further enables backhauling around obstacles, e.g. buildings in urban environment for in-clutter deployments.

Also according to TR 38.874, IAB strives to reuse existing functions and interfaces defined for access. In particular, Mobile-Termination (MT), gNB-DU, gNB-CU, UPF, AMF and SMF as well as the corresponding interfaces NR Uu (between MT and gNB), F1, NG, X2 and N4 are used as baseline for the IAB architectures.

The Mobile-Termination (MT) function has been defined as a component of the Mobile Equipment, and is referred to as a function residing on an IAB-node that terminates the radio interface layers of the backhaul Uu interface toward the IAB-donor or other IAB-nodes.

FIG. 1 illustrates one example architecture for multi-hop backhauling defined in TR 38.874 v16.0.0, showing the reference diagram for a two-hop chain of IAB-nodes underneath an IAB-donor, where IAB-node and UE connect in SA-mode to an NGC.

An IAB-node may be defined as a RAN node that supports wireless access to UEs and wirelessly backhauls the access traffic. An IAB-donor may be defined as a RAN node which provides UE's interface to core network and wireless backhauling functionality to IAB-nodes.

The architecture of FIG. 1 leverages CU/DU-split architecture. That is, the IAB donor node comprises a Central Unit (CU) and one or more Distributed Units (DUs), with an interface called F1 between them. The functionality of the IAB donor is divided between the CU (hosting Radio Resource Control (RRC), Service Data Adaption Protocol (SDAP) and Packet Data Conversion Protocol (PDCP), and which terminates the F1 interface connected with the DU) and DU (hosting Radio Link Control (RLC), Medium Access Control (MAC) and Physical (PHY) layers, and which terminates the F1 interface with the CU) logical nodes. The internal structure (CU/DU) of the IAB donor is not visible to other nodes and the 5G core network (5GC). See 3GPP TS 38.401 (e.g. version 15.2.0, Release 15).

In the architecture of FIG. 1, each IAB-node holds a DU and an MT. Via the MT, the IAB-node connects to an upstream IAB-node or the IAB-donor. Via the DU, the IAB-node establishes RLC-channels to UEs and to MTs of downstream IAB-nodes. For MTs, this RLC-channel may refer to a modified RLC*. An IAB-node can connect to more than one upstream IAB-node or IAB-donor DU. The IAB-node may contain multiple DUs, but each DU part of the IAB-node has F1-C connection only with one IAB-donor CU-CP.

The donor also holds a DU to support UEs and MTs of downstream IAB-nodes. The IAB-donor holds a CU for the DUs of all IAB-nodes and for its own DU. It is assumed that the DUs on an IAB-node are served by only one IAB-donor. This IAB-donor may change through topology adaptation. Each DU on an IAB-node connects to the CU in the IAB-donor using a modified form of F1, which is referred to as F1*. F1*-U runs over RLC channels on the wireless backhaul between the MT on the serving IAB-node and the DU on the donor. An adaptation layer is added—named Backhaul Adaptation Layer, or BAP, in the ongoing normative phase—which performs bearer mapping and routing. It replaces the IP functionality of the standard F1-stack. F1*-U may carry a GTP-U header for the end-to-end association between CU and DU.

The Uu interface represents the interface between the UE and the DU in an IAB node. The F1* interface represents the interface between the IAB DU and an upstream CU.

TR 38.874 v16.0.0 discusses fairness in IAB networks by stating the following (which is not binding in any normative way): "An IAB network should attempt to schedule the wireless resources to meet each UE bearer's requirement regardless of the number of hops a given UE is away from the Donor DU."

In TR 38.874 v16.0.0, the following observation is then made with regards to an important difference between 1:1 and N:1 bearer mapping across the backhaul: "When one-to-one mapping is used between UE bearer and RLC-channel on the backhaul, the IAB-node has explicit information on each UE bearer and can therefore apply appropriate QoS differentiation among QoS profiles, as well as fairness among UE bearers with same QoS profile. While QoS differentiation is still possible when UE bearers are aggregated to backhaul RLC-channels, enforcement of fairness across UE bearers becomes less granular"

In the following, we now provide various examples of the present disclosure to address the desire for fairness and/or managing Quality of Service, QoS. While described separately, it will be appreciated how two or more of these examples may be combined together; examples of which are given below.

Relevant to one or more of the examples are the factors of:

5G QoS Identifier (5QI) which is a scalar that is used to denote a specific QoS forwarding behaviour (e.g. packet loss rate, packet delay budget, guaranteed bit rate or GBR) to be provided to a 5G QoS Flow. Standardized 5QI values have one-to-one mapping to a standardized combination of 5G QoS characteristics. How the RAN implements this is up to implementation but radio standards offer a signalling design which supports decisions that the access node may take (e.g. use of specific scheduling weights, admission thresholds, link layer protocol configuration, etc.).

Packet Delay Budget, or PDB, which is an integral part of 5G QoS characteristics that a 5QI value represents. PDB defines an upper bound for the time that a packet may be delayed between the UE and the UPF that terminates the N6 interface. For a certain 5QI the value of the PDB is the same in UL and DL. In the case of 3GPP access, the PDB is used to support the configuration of scheduling and link layer functions (e.g. the setting of scheduling priority weights and HARQ target operating points). For GBR (guaranteed bit rate) QoS Flows using the Delay-critical resource type, a packet delayed more than PDB is counted as lost if the data burst is not exceeding the MDBV within the period of PDB and the QoS Flow is not exceeding the GFBR.

The 5G Access Network Packet Delay Budget (5G-AN PDB) may be determined by subtracting a static value for the Core Network Packet Delay Budget (CN PDB), which represents the delay between any UPF terminating N6 (that may possibly be selected for the PDU Session) from a given PDB.

Also relevant to certain examples of the present disclosure is that methods for managing QoS according to certain examples of the present disclosure may aim to provide a network where topology-wide fairness is achieved when UE bearers carrying the same service (traffic type/application type) have the same (within a margin) QoS, regardless of the number of hops a given UE is away from the Donor DU. While the focus of fairness here is on user experience, with the overarching aim of making QoS offered independent of topology, in some examples issues such as fair use of processing resources of IAB nodes and equitable use of paths available are addressed.

It should be noted that bearers for different UEs (and in some cases even for same UEs, which means same destination on the DL) traverse different paths on the DL (and UL); they experience different number of hops, different congestion conditions, different radio conditions, buffer status at intermediate nodes and so on. A Donor-CU currently has no knowledge of many of these "field" conditions when configuring the routing tables at intermediate nodes. Additionally, bearers could be N:1 mapped to backhaul RLC channels, and there is no way of ensuring "special treatment" for a subset within that bundle. On the UL there is more scheduling control, but less ability to avoid congestion as we move closer towards Donor-DU.

Example 1

According to certain examples of the present disclosure, a first node in a multi-hop network (such as a Donor-CU/IAB Donor-CU) takes into account one or more of the following when configuring routing at second nodes in the multi-hop network (such as a Donor-DU/IAB Donor-DU, or intermediate node):
number of hops to destination,
congestion conditions on different routes,
radio conditions on different routes including reports of RLF,
buffer status at second nodes,
wireline delay at second nodes including any processing delay and radio protocol operation delay,
Tx/Rx operation switching delay at second nodes,
E2E flow control feedback.
Through this, the first node may manage QoS in the network.

An exemplary method in accordance with Example 1 will now be disclosed with reference to FIG. 2.

In step 210 of FIG. 2, a first node in a multi-hop network obtains first information on one or more conditions at a plurality of second nodes in the multi-hop network.

In one example, it will be appreciated that the first node may be an IAB donor node, or a CU of an IAB donor node, or a base station such as a gNB. Further, the second nodes may be IAB nodes. In an example, the second nodes are a portion of a larger number of second nodes included in the multi-hop network.

In an example related to step 210, at least part of the first information is obtained from the plurality of second nodes (this should be regarded as non-limiting, as the entirety of the first information may instead be obtained elsewhere). For example, each second node may transmit, or signal, information on its condition (that is, the condition of the transmitting node) to the first node. In certain, non-limiting examples, each second node may do this according to a timer or a predetermined conditions; alternatively or additionally, the first node may instruct the plurality of second nodes to provide the information. Specific signalling may be defined for the exchange of the first information.

In another example related to step 210, at least part (or another part) of the first information is obtained by estimating one or more conditions at the plurality of nodes, or estimating conditions in the network, based on one or more factors such as past data, a time of day, current network load, an increase or a decrease in UEs accessing the network, etc.

In step 220 of FIG. 2, the first node identifies a plurality of routes from a first location in the multi-hop network to a second location (e.g., a destination) in the multi-hop network.

In certain examples, each identified route includes one or more of the plurality of second nodes. Accordingly, the first information may allow for derivation of conditions along each route, such as a delay.

According to certain examples, the first information may include or allow for the derivation of one or more of:
a number of hops to the destination for the first bearer;
a number of bearers being carried on one or more BH RLC channels on one or more links of one or more different routes to the destination;
congestion conditions on different routes including information derived from HbH flow control feedback;
radio conditions on different routes including reports of RLF;
buffer status at second nodes;
wireline delay at second nodes including any processing delay and radio protocol operation delay;
Tx/Rx operation switching delay at second nodes;
E2E flow control feedback.

Note that the use of the first information to determine or derive such information may occur as part of step 230 in the method or may be performed separately to step 230.

In certain examples further to the above, the first node may estimate one or more these factors/parameters based on past data. For example, this may be data which the first node has obtained in the past (from second nodes, for example) and stored. More generally, at least another part of the first information is obtained by estimating, by the first node, one or more conditions in the multi-hop network based on stored data regarding the multi-hop network.

In step 230 of FIG. 2, the first node is configured to select a (first) route for a first bearer from among the plurality of routes. This selection is based on the first information (or at least one factor included in the first information), second information on network topology and a first QoS (or a first QoS parameter) corresponding to the first bearer. In certain examples, the first bearer corresponds to a first UE, while in other examples, the first bearer corresponds to a third node in the multi-hop network. Optionally, the third node may be one of the second nodes.

In certain examples, the second information may, more specifically, include one or more of: information on the destination, information on where the first UE attaches or where the third node is located in the multi-hop network (as appropriate), or information on network conditions.

In certain examples, the first location and the second location correspond to the first bearer. For example, the first location may correspond to an attachment location of a UE corresponding to the first bearer (or a location of a third node corresponding to the bearer, as appropriate) in the multi-hop network, while the second location may correspond to a destination of the first bearer (in a non-limiting example, this may be the first node, for the case of uplink).

In certain examples, the manner in which the first information is used to select the route (in an operation such as that of step 230) is based on normalizing treatment of bearers according to various conditions. That is, through signalling exchange (such as the obtaining of the first information by the first node), the first node obtains sufficient information to ensure the QoS of a bearer is met regardless of where a UE corresponding to said bearer attaches in the topology of the multi-hop network or where a third node corresponding to said bearer is located is located in the topology of multi-hop network, as appropriate.

To give a non-limiting example, following on from the method of FIG. 2: the first node selects a (second) route for a second bearer corresponding to a second UE or a fourth node in the multi-hop network from among the plurality of routes, based on the first information, the second information on network topology and a second QoS corresponding to the second bearer. It will be appreciated that this may occur before, after or concurrently with the selecting of a route for the first bearer. In certain example, the fourth node may be one of the second nodes Here, treatment, by the first node, of the first bearer and the second bearer according to the first information is normalized such that at least one of: the first QoS is provided regardless of a place in the multi-hop network where the first UE attaches or where the third node is located; and the second QoS is provided regardless of a place in the multi-hop network where the second UE attaches or where the fourth node is located.

In a further example, treatment of one of the first bearer and the second bearer is weighted in favour of the one of the first bearer and the second bearer over the other one of the first bearer and the second bearer, as in proportional fair scheduling. In other words, fairness does not require equitable fairness, but may also take into account other issues. For instance, the weighting may take into account processing resources of second nodes, equitable use of paths available, historic data on providing QoS to the first bearer and the second bearer, etc.

To give an example of selecting the route for the first bearer, in accordance with step 230 for instance, said selecting may include: determining a delay for each route of the plurality of routes, based on the first information, and selecting the route for the first bearer based on the determined delay, the second information and the first QoS. Here, it will be appreciated how the first information, bearing in mind the exemplary definition of such given above, may be used to determine a delay for each route. Furthermore, it will be understood that examples of the present disclosure (not just those in relation to Example 1, but also those described below for the other Examples) include determining a delay for only a subset of the routes and/or determining a delay for only part of one or more of the routes.

To determine a delay for a route, for instance, the first information may be used to identify a prevailing condition at one or more second nodes along the route (the prevailing condition relating to the multi-hop network or the node itself), where said prevailing condition can be used, by the first node, to determine a delay between each of the one or more second nodes. In this way, the first node can determine, or at least estimate, the delay along the route (or the part of the route corresponding to the one or more second nodes).

As a further example in relation to step 230, selecting the route for the first bearer may require selecting a route from among the plurality of routes which will meet, or achieve, the first QoS of the first bearer. This selection may ignore the number of hops to the destination; that is, the first node will configure a route for the first bearer which should satisfy the QoS requirement regardless of the number of hops to the destination for the first bearer, by using the first information. This can then be used to achieve fairness across the bearers.

In another example in relation to step 230, the first node selects a route for a second bearer corresponding to a second UE (or corresponding to a fourth node in the multi-hop network, as mentioned in another example above) from among the plurality of routes, based on the first information, the second information on network topology and a second QoS corresponding to the second bearer; wherein the first QoS and the second QoS are within a predetermined margin of one another, or the first QoS and the second QoS are the same.

In certain examples, the first UE and the second UE may be the same UE; in other words, the first bearer and the second bearer correspond to the same UE. In other examples, the first UE and the second UE are different UEs. Similarly, in certain example the fourth node and the third node may be the same, while in other examples they are different.

In an example further to this, the predetermined margin is determined, by the first node, according to one or more of: information on usage of the first UE; information on usage of the second UE; historic Quality of Experience, QoE (which includes subjective quality experience of the user), information for one or more of the first bearer and the second bearer; information on a Service Level Agreement, SLA, for the first UE; and information on a SLA for the second UE.

In another example in relation to the method of FIG. 2, the first QoS is determined as the average QoS across all bearers of the first UE (or the third node) or a subset of all bearers of the first UE (or the third node).

In an example further to this, the subset of bearers of the first UE (or the third node) includes: bearers with predetermined critical services; bearers with a Packet Delay Budget, PDB, below a predetermined level; or all non best-effort, BE, bearers.

In another example such as may follow on from the method of FIG. 2, the first node configures the selected route for the first bearer for simultaneous use by a group of bearers including at least one third bearer and the first bearer, according to a predetermined condition; wherein each of the at least one third bearer correspond to a QoS within a predetermined range of the first QoS.

In an example further to this, configuring the route according to the predetermined condition includes configuring sharing of the route based on: load balancing in at least part of the multi-hop network; and a number of BH RLC channels on a single link configured to support the QoS-related requirement. For instance, these may be examples of said predetermined condition.

In an example further to this, in a case where the number of BH RLC channels on a single link is insufficient, the method comprises aggregating two or more bearers from among the group of bearers.

In an example further to this, the method further comprises: configuring, by the first node, information for demultiplexing at least a portion of the group of bearers; and transmitting, to a fifth node in the multi-hop network, the information for demultiplexing the one or more bearers of the group of bearers.

In an example further to this, the fifth node is located along the selected route in the multi-hop network. In certain examples, the fifth node is one of the second nodes.

In an example further to this, the group of bearers are multiplexed to a first RLC channel; and wherein the information for demultiplexing indicates a second RLC channel to which one or more of the portion of the plurality of bearers is to be multiplexed to.

In an example further to this, the Backhaul Adaptation Protocol, BAP, includes a bearer ID for each of the group of bearers; and wherein configuring the route further comprises configuring the route based on the bearer IDs.

In an example further to this, a BAP header comprises QoS information for each of the group of bearers, the QoS information including one or more of guaranteed bit rate, GBR, minimal packet error rate, PER, and packet delay budget, PDB.

Following the method shown in FIG. 2, in certain examples, the first node may transmit the route for the first bearer to one or more second nodes.

According to another method according to Example 1, a method for managing QoS at a second node (for example, a second node interrelated with a first node such as described above) is provided.

In an example of such a method is illustrated in FIG. 3. Here, the method comprises step 310, in which a second node in a multi-hop network transmits first information on a condition at the second node to a first node in the multi-hop network.

In step 320 of FIG. 3, the second node receives, from the first node, a (first) route for a first bearer in the multi-hop network, the first bearer corresponding to a first QoS (or a first QoS parameter).

In step 330 of FIG. 3, the second node transmits the first bearer based on the route.

In an example related to FIG. 3, the first information may be defined as above in relation to the method at a first node (such as the method of FIG. 2, for instance).

In a further example related to FIG. 3, the route for the first bearer is for simultaneous use by a group of bearers including at least one second bearer and the first bearer, according to a predetermined condition; and each of the at least one second bearer correspond to a QoS within a predetermined range of the first QoS.

In an example such as may follow on from the method of FIG. 3, the method further comprises: transmitting, by the second node, the group of bearers to a third node in the multi-hop network based on the route, wherein the third node is a parent node of the second node or a child node of the second node; or demultiplexing, by the second node, one or more bearers of the group of bearers.

In an example further to this, the one or more bearers are demultiplexed if the second node detects that a condition is satisfied or if the second node receives, from the first node, information indicating that the condition has been detected to be satisfied; and the condition corresponds to one or more of: a determination that QoS of each of the group of bearers cannot be guaranteed if the group of bearers remain multiplexed upon being transmitted from the first node; a determination that one or more links in the multi-hop network are unavailable and/or one or more links in the multi-hop network have throughput below a threshold; and a determination that the group of bearers includes bearers having different destinations in the multi-hop network.

Reference will now be made to FIG. 4 in the context of providing an illustrative example of a method according to Example 1.

FIG. 4 shows a schematic of an exemplary multi-hop network 400 which includes a number of nodes: A, B, C, D, E, F, G, H, I. For the purposes of the example, these nodes may be considered to be second nodes, as referred to above. The arrows shown in FIG. 4 are unidirectional, however this is not to be considered in any way limiting on communications between the nodes, but merely provides an aid for understanding the example.

Referring to FIG. 4: a start location (for example, a point in the multi-hop network where the UE corresponding to the first bearer attaches) may be A while a destination location may be H. Accordingly, a first node, which may be a CU, is to configure a route from A to H for the first bearer while meeting a first QoS for the first bearer. The first node may determine a delay for the two routes A $\rightarrow$ C $\rightarrow$ E $\rightarrow$ H and A $\rightarrow$ C $\rightarrow$ F $\rightarrow$ H, and determine that the first QoS of the first bearer may only be satisfied if the route A $\rightarrow$ C $\rightarrow$ F $\rightarrow$ H is selected for the first bearer, in view of determining there being less congestion on the path from C $\rightarrow$ F $\rightarrow$ H than the path from C $\rightarrow$ E $\rightarrow$ H..

However, in another example, referring also to FIG. 4: a start location may be C while a destination location may be H (i.e., there is one hop less than the previous example). Accordingly, a first node, which may be a CU, is to configured a route from C to H for a first bearer while meeting the first QoS (being the same or substantially the same as the QoS in the previous example). The first node may again determine a delay for the routes A $\rightarrow$ C $\rightarrow$ E $\rightarrow$ H and A $\rightarrow$ C $\rightarrow$ F $\rightarrow$ H, but in this example the first node may determine that either route would satisfy the first QoS of the first bearer, despite the difference in delay (due to there being one less hop that the previous example). As a result, the first node may pick either route for the first bearer. In a refinement, the first node may pick route A $\rightarrow$ C $\rightarrow$ E $\rightarrow$ H, this route having a greater delay, to leave less-congested route A $\rightarrow$ C $\rightarrow$ F $\rightarrow$ H free for another bearer which may require a less-congested route (due to having more hops to its destination but a QoS similar to the first QoS, for example).

Further to the above examples, the route may be selected also in consideration of one or more of the following:
  fair use of processing resources of IAB nodes;
  equitable use of paths available;
  spreading out of congestion in the network (load balancing);
  avoidance of second nodes with buffer occupancy higher than a certain threshold.

Example 2

Another example for managing QoS in a multi-hop network in accordance with the present disclosure will now be described.

Identical PDB requirements for two bearers can lead to two different PDB/per hop. As such, in an example, a first node, such as a CU, configures the PDB/hop at second nodes (for example, intermediate nodes) and/or remaining validity (beyond which PDB could not be met, e.g. in ms) for a bearer for all or some of the second nodes.

In a further example, the first node modifies (e.g., reduces) the value of PDB/hop which it communicates to one or more second nodes (thereby creating an "effective PDB") based on one or more of the following:
  congestion conditions on different routes;
  radio conditions on different routes including reports of RLF;
  buffer status at second nodes;
  wireline delay at second nodes including any processing delay and radio protocol operation delay;
  Tx/Rx operation switching delay at second nodes;
  E2E flow control feedback An exemplary method according to Example 2 is now described with reference to FIG. 5.

In step 510 of FIG. 5, a first node in a multi-hop network identifies a number of hops for a bearer from a location to a destination in the multi-hop network. In step 520, the first node configures information on a PDB per hop for at least one second node between the location and the destination, based on the identified number of hops and a PDB of the bearer. In step 530, the first node transmits QoS information including the information on the PDB per hop to one or more second node between the location and the destination.

In a further example to the above, the first node may obtain first information including information on at least one condition in the multi-hop network, wherein the information is at least partly obtained from one or more second node in the multi-hop network. In certain example, the first information may correspond to that described above in relation to step 210 of FIG. 2.

The first node may then determine an effective PDB per hop for at least one second node between the location and the destination, based on the PDB of the bearer and the first information. It will be appreciated that this could form part of step 520. The information on the PDB per hop, such as transmitted (in the QoS information) in step 530, may then include the effective PDB per hop.

In certain examples, the PDB per hop does not need to be determined to determine the effective PDB per hop; while in other examples, the effective PDB may be obtained by first determining the PDB per hop and then reducing or increasing the PDB per hop based on the first information, as appropriate. That is, while some examples include configuring a PBD per hop and then modifying it to an effective PDB per hop, other examples directly configure the effective PDB per hop without first configuring the PDB per hop.

In certain examples, the location corresponds to an attachment location of a UE in the multi-hop network, the UE corresponding to the bearer. In other examples, the location corresponds to a location of a third node in the multi-hop network, where the bearer corresponds to the third node.

Another example which, for instance, may describe operations of a second node interrelated to the first node described in the previous paragraphs, is illustrated in FIG. 6.

In step 610, a second node in a multi-hop network transmits, to a first node in a multi-hop network, first information including information on at least one condition in the multi-hop network. In step 620, the second node receives, from the first node, QoS information including information on a PDB per hop for a bearer in the multi-hop network. In step 630, the second node selects a third node in the multi-hop network to route the bearer to, based on the information related to the PDB per hop an information on a condition of the third node.

In certain examples, the information on the PDB per hop includes an effective PDB per hop (such as described above in relation to the method of FIG. 5).

In certain examples, the information on a condition of the third node may indicate, to the second node, that transmitting the bearer to the third node may satisfy the PBD per hop of the bearer. In a further example, the third node is selected to satisfy QoS for the bearer.

In certain examples, on the downlink, the third node is a child node of the second node, and, on the uplink, the third node is a parent node of the second node.

In certain examples, the information on the PDB per hop indicates for the second node to select the third node; or wherein the third node is selected, by the second node, based on determining a delay corresponding to the third node equal to or less than the PDB per hop.

Example 3

Another example for managing QoS in a multi-hop network in accordance with the present disclosure will now be described.

In this example, a first node, such as a CU, groups bearers requiring the same treatment to share the routes as much as possible (this may or may not include aggregation/multiplexing onto the same backhaul channel or channels). This may help ensure the same delay (which can be important if all bearers have the same PDB).

In an example, the metric for determining "as much as possible" is linked (optionally in addition to the delay considerations already mentioned in combination with the examples above) to additionally achieving load balancing in all or parts of the network, avoiding congestion in all or parts of the network, number of backhaul (BH) RLC channels on a single link which can support the required PDB or other QoS characteristic of the bearers (if there aren't enough then different links can be used, or can resort to N:1 mapping of bearers).

In a further example of the above, which may be of particular relevant for the aggregated bearers case (N:1 mapping), demultiplexing and (re-)multiplexing of bearers at a second node (such as an intermediate node) is performed. This may be configured either by the first node or locally decided by the second node. To support this, bearer IDs may be inserted in the backhaul adaptation protocol (BAP) data PDU and routing is done in part based on bearer ID. In a further example, QoS information is provided in the BAP header to assist with this. Furthermore, in further examples to those described in combination with "Example 1" and "Example 2" above, QoS information may be provided in the BAP header here also.

A method in accordance with Example 3 is illustrated in FIG. 7. Here, in step 710, a first node in a multi-hop network identifies a plurality of bearers each having a QoS-related requirement (for example, PDB or QoS) within a margin of one another. In step 720, the first node configures one or more routes in the multi-hop network to be used simultaneously by the plurality of bearers according to a predetermined condition.

For the plurality of bearers to each have a QoS-related requirement within a margin of one another, this may, for example, be regarded as meaning that the QoS-related requirement of each bearer is the same or substantially the same. That is, in one example, the QoS-related requirements of the bearers are similar to a predetermined extent. Accordingly, in certain examples, step 710 may involve identifying bearers having one or more QoS-related requirements which are similar to a predetermined extent (examples related to this are found in the discussion of Example 4 below).

In one example, the predetermined condition may reflect a condition by which the plurality of bearers simultaneously use the same route (or a same part of a route). For instance, while it may be intended that a group of bearers having similar QoS-related requirements are to use the same route in a multi-hop network, this may still be conditional, for example, on load balancing in all or a part of the multi-hop network (that is, on congestion avoidance or mitigation in all or parts of the network), on the number of backhaul RLC channels on a single link which are configured to support the QoS-related requirement, or on one of the other factors relating to delay such as have been described in combination with Examples 1 and 2 above.

It will be appreciated that, in an example of the present disclosure, the first node may signal information relating to the configuring of one or more routes to be used by the plurality of bearers to a second node in the multi-hop network. For example, said information may indicate the group of bearers (i.e., the plurality of bearers) which are to share the same routes; and may also indicate the predetermined condition for said sharing.

In further examples, where a group of bearers is a plurality of multiplexed bearers and one or more routes are configured for the multiplexed bearers, the second node may be configured to demultiplex the bearers according to one or more (demultiplexing) conditions being satisfied (where such a condition may be regarded as a trigger).

A method in accordance with this element of Example 3 is illustrated in FIG. 8. Here, in step 810, a second node identifies a first set of bearers each having a QoS-related requirement within a predetermined range. In step 820, the second node demultiplexes the first set of bearers based on a demultiplexing condition being satisfied To give some examples of such (demultiplexing) conditions: the second node may determine that the QoS-related requirement of the bearers cannot be guaranteed if the multiplexed bearers are transmitted from the second node; the second node may determine that certain links in the multi-hop network are unavailable, and that the links which are available have lower throughput; or the second node may determine that the multiplexed bearers are actually destined for different locations in the multi-hop network.

Accordingly, upon detection of one of more condition being satisfied, the second node may demultiplex (de-aggregate) the plurality of bearers, as illustrated in step 820. In a further example, the second node may then multiplex two or more of the plurality of bearers into another group, according to a QoS-related requirement being similar (or within a margin) for the bearers in this other group.

In certain examples, satisfaction of a (demultiplexing) condition (such as the one or more highlighted above) may be determined by the second node itself; that is based on measurements made by the second node. Alternatively or additionally, the second node may be informed (through signalling, for example) that a trigger condition has been satisfied by the first node, for example such as that performing the method of FIG. 7. In other words, the demultiplexing may be configured by the first node or locally decided by the second node.

In examples according to the present disclosure, a method in accordance with Example 3 may be combined with a method in accordance with Example 1 or a method in accordance with Example 6, as would be readily appreciated by the skilled person.

For example, in such a combined method, a route for a first bearer may be selected/configured according to a method mentioned in relation to Example 1, and one or more other second bearers having a similar QoS-related requirement (such as a QoS) to the first bearer may be identified and grouped with the first bearer, where the group of the bearers (including the first bearer and the second bearers) then simultaneously use the selected route as described in relation to an example according to Example 3. It will be appreciated that in certain examples the first bearer and the second bearers may be multiplexed and, optionally, conditionally demultiplexed, as also described above.

Example 4

Another example for managing QoS in a multi-hop network in accordance with the present disclosure will now be described.

It has been discussed how an aim of certain examples of the present disclosure is to manage QoS or QoS related requirements in a multi-hop network, such that fairness is provided. For instance, two bearers for the same service having similar QoS requirements are to be treated the same/similarly, regardless of a number of hops a corresponding UE is from the destination of the bearers.

According to a method in accordance with Example 4, a margin (or leeway) is introduced into what is meant by 'to be treated similarly'. For example, a tolerable difference in delay and/or throughput can introduced. This margin may be based on knowledge at the first node (such as a CU of a IAB donor) of UE usage (for example: is the UE serving a robotic unit? Is the UE being used for H2H communication?), where the past QoE (which takes into account the subjective impression of the objective QoS), any existing service level agreements (SLAs), and so on.

It will be appreciated that methods according to Example 4 can be combined with methods according to one or more of Examples 1 to 3 and 6, as appropriate.

For example, in relation to Example 1, certain examples disclose methods which have the aim that bearers having a similar QoS (within a margin) and, optionally, carrying the same service are to be treated the same. A method in accordance with Example 3 for calculating the margin, or for defining what is intended by being treated the same, may be employed in combination with such methods according to Example 1.

Example 5

Another example for managing QoS in a multi-hop network in accordance with the present disclosure will now be described.

In one example, the QoS used for comparisons (to ensure fairness is achieved) is averaged across all or some bearers of a UE (rather than it being per-bearer). The selection of the sub-set of bearers could be done in following ways:

Only bearers with certain critical services are taken into account (e.g. those carrying URLLC traffic);

Only bearers with a PDB below a certain level are taken into account;

All non-BE (best-effort) bearers are taken into account.

When averaging is done across all the bearers, this is especially relevant for a single-service UEs (e.g. an IoT/MTC sensor, or a UE serving a robot with a single type of traffic). Additionally, in certain examples, per-UE QoS approach to fairness may be better suited (and more tractable) than per-bearer QoS approach on the UL, since on the UL most if not all UE bearers should follow the same path to the Donor-DU (although this is not a hard requirement).

It will be appreciated that methods according to Example 5 can be combined with methods according to one or more of Examples 1 to 4 and 6.

For example, referring to an example in accordance with Example 1, the first QoS corresponding to the first bearer may, in fact, be determined as the average QoS across all bearers of the first UE (which corresponds to the first bearer) or a subset of all bearers of the first UE. The sub-set of bearers of the first UE may be defined according to one or more of the ways mentioned above.

Example 6

Another example for managing QoS in a multi-hop network in accordance with the present disclosure will now be described.

In certain examples of the present disclosure, fairness granularity is per LCH of a UE, or averaged per a subset of logical channels (LCHs) of a UE, or averaged across all LCHs of a UE. For the case of a subset, the subset of LCHs may be selected using similar conditions as described above for selecting a subset of bearers as described in relation to Example 5. Additionally, they can be grouped (for purposes of QoS management) into Logical Channel Groups (LCGs), already used in regular scheduling operation (such as Buffer Status Reporting).

The skilled person would appreciate how this disclosure may be combined with that of Example 1, for instance, so as to result in a method for managing QoS in a multi-hop network along the lines of one described in accordance with Example 1 but implementing fairness granularity based on LCH of a UE as opposed to based on a bearer(s). One key difference is that the per-LCH QoS management and related fairness mechanisms are useful as an indicator of lower layers' performance and are agnostic to features such as split bearer. Enforcing per-LCH fairness would therefore be a useful tool to ensure fair performance of BAP layer and below across the network.

Methods in accordance with Example 6 are illustrated in FIGS. 9 and 10, where similarities with the method of FIGS. 2 and 3 will be appreciated.

In step 910 of FIG. 9, a first node in a multi-hop network obtains first information on one or more conditions at second nodes in the multi-hop network, with at least part of the first information being obtained from the second nodes. Reference is made to the discussion of step 210 of FIG. 2 for this operation, to provide further examples of this operation, such as to provide an exemplary definition of the first information, the first node, the second nodes etc.

In step 920 of FIG. 9, the first node identifies routes from a location to a destination in the multi-hop network. Reference is made to the discussion of step 220 of FIG. 2 for this operation, to provide further examples of this operation, such as to provide descriptions of the routes, the location and the destination.

In step 930 of FIG. 9, the first node selects a (first) route for data for a first logical channel, LCH, from among the plurality of routes, based on the first information, second information on network topology and a first QoS corresponding to the first LCH, wherein the first LCH corresponds to a first UE or a third node in the multi-hop network. Once again, we refer to the relevant step of FIG. 2—being step 230—to provide various examples of step 930. In particular, it is submitted that the various examples mentioned above in relation to step 230 may apply analogously to step 930, as would be appreciated by the skilled person.

For example, in an analogous manner to an example described above in relation to Example 1, the first node may configure the selected route for (data for the) first LCH for simultaneous use by a group of LCH including at least one third LCH and the first LCH, according to a predetermined condition; wherein each of the at least one third LCH correspond to a QoS within a predetermined range of the first QoS. The further disclosures/examples related to such a method described above for Example 1 also apply to this example which refers to an LCH instead of a bearer.

Referring now to FIG. 10, step 1010 describes a second node in a multi-hop network transmitting first information on a condition of the second node to a first node in the multi-hop network. Reference is made to step 310 of FIG. 3 and the discussion thereof for examples of this operation, where the skilled person would understand how these examples could be modified to apply to the case for a LCH as opposed to a bearer, and so analogous examples can be derived for the method of FIG. 10.

In step 1020, the second node receives, from the first node, a (first) route for data for a first logical channel, LCH, in the multi-hop network, the first LCH corresponding to a first QoS. Reference is made to step 320 of FIG. 3 and the discussion thereof for examples of this operation, where the skilled person would understand how these examples could be modified to apply to the case for a LCH as opposed to a bearer, and so analogous examples can be derived for the method of FIG. 10.

In step 1030, the second node transmits the data of the first LCH on the route. Reference is made to step 330 of FIG. 3 and the discussion thereof for examples of this operation, where the skilled person would understand how these examples could be modified to apply to the case for a LCH as opposed to a bearer, and so analogous examples can be derived for the method of FIG. 10.

The claims further illustrate how a method according to Example 6 may be interpreted with respect to a method according to Example 1, through the alternatives provided therein.

Further Example

FIG. 11 is a block diagram illustrating an exemplary network entity 1100 that may be used in examples of the present disclosure.

For example, a first node, second node, third node etc. as described in any of the examples presented in this disclosure may generally be configured as shown in FIG. 11; having a transmitter 1102, a receiver 1104 and a controller 1106. For example, referring to a first node in accordance with Example 1, the first node may obtain the first information via a receiver 1104 of the first node, in the case that at least part of the first information is received from the plurality of second nodes. In this case also, a second node of this plurality may have transmitted part of the first information via a transmitter 1102 of said second node.

To give a further example, a controller 1106 of the first node may be configured to identify a plurality of routes from a location to a destination in the multi-hop network; and to select a route for a first bearer or data for a first LCH corresponding to a first UE or a third node from among the plurality of routes, based on the first information, second information on network topology and a first QoS corresponding to the first bearer or first LCH.

To give an illustration of a method according to the present disclosure, where said method involves a combination of methods according to different ones of the Examples described herein, FIG. 12 is presented.

In step 1210, a 5G QoS Identifier (5QI) is received from the core network (SFN) by a first node, exemplified as a (IAB) Donor-CU for the remainder of the method (however it will be appreciated that this is non-limiting and that the first node may be another type of radio access node or the like).

In step 1220, the first node determines the access network PDB (e.g. the 5G AN PDB). A method for this has been described above.

In step 1230, the first node obtains feedback from second nodes (exemplified here as intermediate nodes, but again this should not be seen as limiting) in the multi-hop network or in a part of the multi-hop network. said feedback relating to link and node status, wireline delay etc. (again, this is a non-limiting list; above it has been described (in relation to Example 1 and Example 2, for instance) what type(s) of information/feedback may be obtained from second nodes in a multi-hop network.

In step 1240, the first node obtains end to end (E2E) flow control feedback. Although shown here in FIG. 12, it will be understood that this step is optional, and/or the E2E flow control feedback may be obtained at the time the feedback from the second nodes is obtained.

In step 1250, the first node determines the effective PDB per hop. Methods for this have been described in relation to Example 2.

In step 1260, the first node determines whether QoS profile of a bearer can be guaranteed.

If so, in step 1270, the first node shares the effective PDB per hop with each second node and a third node (the third node being an (IAB) Donor-DU, in the illustrative example). For example, the first node may signal information regarding the effective PDB per hop to each second node in order to share the effective PDB per hop.

If the QoS profile cannot be guaranteed, in step 1280 the core network is notified.

Further examples in accordance with the present disclosure are now presented:

According to a first example here, a method for managing QoS is provided, the method comprising: identifying, by a first node, a plurality of bearers each having a QoS-related requirement within a margin of one another; and configuring, by the first node, one or more routes in a multi-hop network to be used simultaneously by the plurality of bearers according to a predetermined condition.

In a further example, the QoS-related requirement corresponds to one of a Packet Delay Budget, PDB, and a QoS.

In another further example, configuring the one or more routes to be used by the plurality of bearers according to the predetermined conditions includes configuring sharing of the one or more routes based on: load balancing in at least part of the multi-hop network; and a number of BH RLC channels on a single link configured to support the QoS-related requirement.

In yet another further example, in a case where the number of BH RLC channels on a single link is insufficient, the method comprises aggregating two or more of the plurality of bearers.

In yet another further example, the method further comprises: configuring, by the first node, information for demultiplexing a portion of the plurality of bearers; and transmitting, to a second node in the multi-hop network, the information for demultiplexing the portion of the plurality of bearers.

In yet another further example, the portion of the plurality of bearers are multiplexed to a first RLC channel; and the information for demultiplexing indicates a second RLC channel to which one or more of the portion of the plurality of bearers is to be multiplexed to.

In yet another further example, the Backhaul Adaptation Protocol, BAP, includes a bearer ID for each of the plurality of bearers; and wherein configuring the one or more routes further comprises configuring the one or more routes based on the bearer IDs.

In yet another further example, a BAP header comprises QoS information for each of the plurality of bearers, the QoS information including one or more of guaranteed bit rate, GBR, minimal packet error rate, PER, and packet delay budget, PDB.

According to a second example here, another method for managing QoS is provided, the method comprising: identifying, by a first node in a multi-hop network, a first set of bearers each having a QoS-related requirement within a predetermined range; and demultiplexing, by the first node, the first set of bearers based on a condition being satisfied.

In a further example, the first set of bearers are multiplexed to a first RLC channel; and In another further example, the method further comprises: multiplexing, by the first node, a portion of the first set of bearers to a second RLC channel.

In yet another further example, the first node detects the condition is satisfied, or the first node receives information from a second node of the multi-hop network indicating that the condition has been detected to be satisfied.

In yet another further example, the condition corresponds to one or more of: a determination that QoS of each of the first set of bearers cannot be guaranteed if the first set of bearers remains multiplexed upon being transmitted from the first node; a determination that one or more links in the multi-hop network are unavailable and/or one or more links in the multi-hop network have throughput below a threshold; and a determination that first set of bearers includes bearers having different destinations on the multi-hop network.

While the invention has been shown and described with reference to certain examples, it will be understood by those skilled in the art that various changes in form and detail may be made therein without departing from the scope of the invention, as defined by the appended claims.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method performed by an integrated access and backhaul (IAB) donor-central unit (CU) in a multi-hop communication network, the method comprising:
    obtaining first information on one or more conditions in the multi-hop network;
    identifying a plurality of routes from a first location to a second location in the multi-hop network; and
    selecting a first route for a first bearer from among the plurality of routes, based on the first information, second information on a network topology and a first quality of service (QOS) corresponding to the first bearer,
    wherein the first information includes information on a number of bearers carried on one or more back haul (BH) radio link control (RLC) channels on the first route to the second location.

2. The method of claim 1, wherein the first information further includes one or more of:
    information on a number of hops to the second location in the multi-hop network for the first bearer;
    information on congestion conditions on one or more different routes in the multi-hop network; and
    information on radio conditions on one or more different routes to the second location in the multi-hop network, the radio conditions including reports of radio link failure (RLF) or availability of a link.

3. The method of claim 1, wherein the first information further includes a first number of hops and a second number of hops being greater than the first number of hops, and
    in case that the first location indicates the first number of hops to the second location, the first route corresponds to a first average delay per hop, based on the second information and the first QoS; and
    in case that the first location indicates the second number of hops to the second location, the first route corresponds to a second average delay per hop shorter than the first average delay per hop, based on the second information and the first QoS.

4. The method of claim 1,
    wherein a backhaul adaptation protocol (BAP) header comprises QoS information for each of group of bearers including at least one second bearer and the first bearer, and
    wherein the QoS information includes at least one of a guaranteed bit rate (GBR), minimal packet error rate (PER), and packet delay budget (PDB).

5. The method of claim 1, further comprising:
    configuring the first route for the first bearer for simultaneous use by a group of bearers including at least one second bearer and the first bearer, based on a predetermined condition;

wherein the at least one second bearer corresponds to a QoS within a predetermined range of the first QoS, and wherein configuring the first route according to the predetermined condition includes configuring sharing of the first route based on:
load balancing in at least part of the multi-hop network, and
a number of backhaul (BH) radio link control (RLC) channels on a single link configured to support QoS-related requirement.

6. A method performed by an integrated access and backhaul (IAB) donor-distributed unit (DU) in a multi-hop network, the method comprising:
transmitting, to an integrated access and backhaul (IAB) donor-central unit (CU), first information including information on at least one condition in the multi-hop network;
receiving, from the IAB donor-CU, quality of service (QOS) information including information on a Packet Delay Budget (PDB) per hop for a first bearer; and
selecting a third node in the multi-hop network to route the first bearer to, based on the information on the PDB per hop and information on a condition of the third node,
wherein the first information includes information on a number of bearers carried on one or more back haul (BH) radio link control (RLC) channels on the first route to a second location.

7. The method of claim 6,
wherein the information on the PDB per hop includes an effective PDB per hop,
wherein, on a downlink, the third node is a child node of the IAB donor-DU, and, on an uplink, the third node is a parent node of the IAB donor-DU, and
wherein the information on the PDB per hop indicates that the IAB donor-DU is to the third node, or
wherein the third node is selected, by the IAB donor-DU, based on determining a delay corresponding to the third node equal to or less than the PDB per hop.

8. An integrated access and backhaul (IAB) donor-central unit (CU) in a multi-hop network, the IAB donor-CU comprising:
a transmitter and a receiver; and
a controller coupled to the transmitter and the receiver, and configured to:
obtain first information on one or more conditions in the multi-hop network,
identify a plurality of routes from a first location to a second location in the multi-hop network, and
select a first route for a first bearer from among the plurality of routes, based on the first information, second information on a network topology and a first quality of service (QOS) corresponding to the first bearer,
wherein the first information includes information on a number of bearers carried on one or more back haul (BH) radio link control (RLC) channels on the first route to the second location.

9. The LAB donor-CU of claim 8, wherein the first information includes one or more of:
information on a number of hops to the second location in the multi-hop network for the first bearer,
information on congestion conditions on one or more different routes in the multi-hop network, and
information on radio conditions on one or more different routes to the second location in the multi-hop network, the radio conditions including reports of radio link failure (RLF) or availability of a link.

10. The IAB donor of claim 8, wherein the first information further includes a first number of hops and a second number of hops being greater than the first number of hops, and:
in case that the first location indicates the first number of hops to the second location, the first route corresponds to a first average delay per hop, based on the second information and the first QoS, and
in case that the first location indicates the second number of hops to the second location, the first route corresponds to a second average delay per hop shorter than the first average delay per hop, based on the second information and the first QoS.

11. The LAB donor-CU of claim 8,
wherein a backhaul adaptation protocol (BAP) header comprises QoS information for each of group of bearers including at least one second bearer and the first bearer, and
wherein the QoS information includes at least one of a guaranteed bit rate (GBR), minimal packet error rate (PER), and packet delay budget (PDB).

12. The IAB donor-CU of claim 8, wherein the controller is further configured to:
configure the first route for the first bearer for simultaneous use by a group of bearers including at least one second bearer and the first bearer, based on a predetermined condition,
wherein the at least one second bearer corresponds to a QoS within a predetermined range of the first QoS,
wherein configuring the first route according to the predetermined condition includes configuring sharing of the first route based on:
load balancing in at least part of the multi-hop network, and
a number of backhaul (BH) radio link control (RLC) channels on a single link configured to support QoS-related requirement.

13. An integrated access and backhaul (IAB) donor-distributed unit (DU) in a multi-hop network, the IAB donor-DU comprising:
a transmitter and a receiver; and
a controller coupled to the transmitter and the receiver, and configured to:
transmit, to an integrated access and backhaul (IAB) donor-central unit (CU), first information including information on at least one condition in the multi-hop network,
receive, from the IAB donor-CU, quality of service (QOS) information including information on a Packet Delay Budget (PDB) per hop for a first bearer, and
select a third node in the multi-hop network to route the first bearer to, based on the information on the PDB per hop and information on a condition of the third node,
wherein the first information includes information on a number of bearers carried on one or more back haul (BH) radio link control (RLC) channels on the first route to a second location.

14. The LAB donor-DU of claim 13,
wherein the information on the PDB per hop includes an effective PDB per hop,
wherein, on a downlink, the third node is a child node of the IAB donor-DU, and, on an uplink, the third node is a parent node of the IAB donor-DU, and wherein the information on the PDB per hop indicates that the IAB donor-DU is to the third node, or wherein the third node is selected, by the IAB donor-DU, based on determining a delay corresponding to the third node equal to or less than the PDB per hop.

* * * * *